July 1, 1924.

G. GERACE

ICE CREAM CONE BAKING MACHINE

Filed Nov. 1, 1923

Inventor
Giuseppe Gerace
By Shepherd & Campbell
Attorneys

Patented July 1, 1924.

1,499,649

UNITED STATES PATENT OFFICE.

GIUSEPPE GERACE, OF LEBANON, PENNSYLVANIA.

ICE-CREAM-CONE-BAKING MACHINE.

Application filed November 1, 1923. Serial No. 672,113.

*To all whom it may concern:*

Be it known that I, GIUSEPPE GERACE, a citizen of the United States, residing at Lebanon, in the county of Lebanon and State of Pennsylvania, have invented certain new and useful Improvements in Ice-Cream-Cone-Baking Machines, of which the following is a specification, reference being had therein to the accompanying drawings.

This invention relates to ice cream cone baking machines and more particularly to a machine of the type of that illustrated in Patent 1,432,049 issued to L. Berzon and J. Brezin on October 17, 1922.

The machine of that patent comprises a plurality of molds rotating about a horizontal axis the outer mold sections or cores being adapted to have outward swinging movement when they reach the point of removal of the baked cone. A machine of that type is highly efficient in so far as the rapidity with which cones may be baked, is concerned. However, much of the heat is wasted by radiation as the baking elements rotate in the open.

It is the primary object of the present invention to provide an oven or casing for a machine of that type and so relate it to the machine that the latter may function in its normal manner, while at the same time the baking elements are caused to rotate in what is, in effect, a heated chamber.

Further objects and advantages of the invention will be set forth in the detailed description which follows.

In the accompanying drawing.

Like numerals designate corresponding parts in all of the figures of the drawings.

Figure 1:
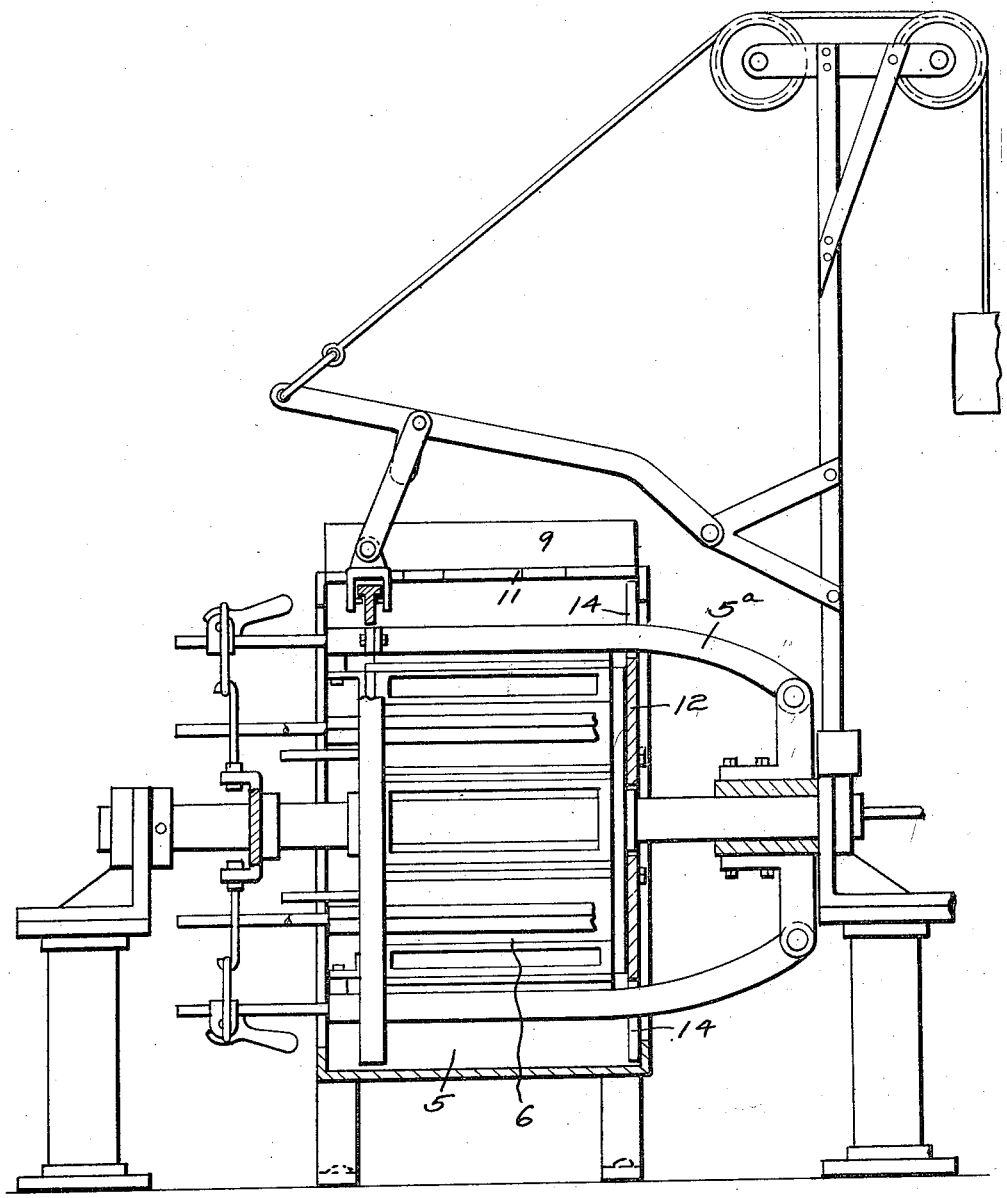
Fig. 1 is a side elevation of a machine of the character described having my invention applied thereto.
Figures 2, 3:
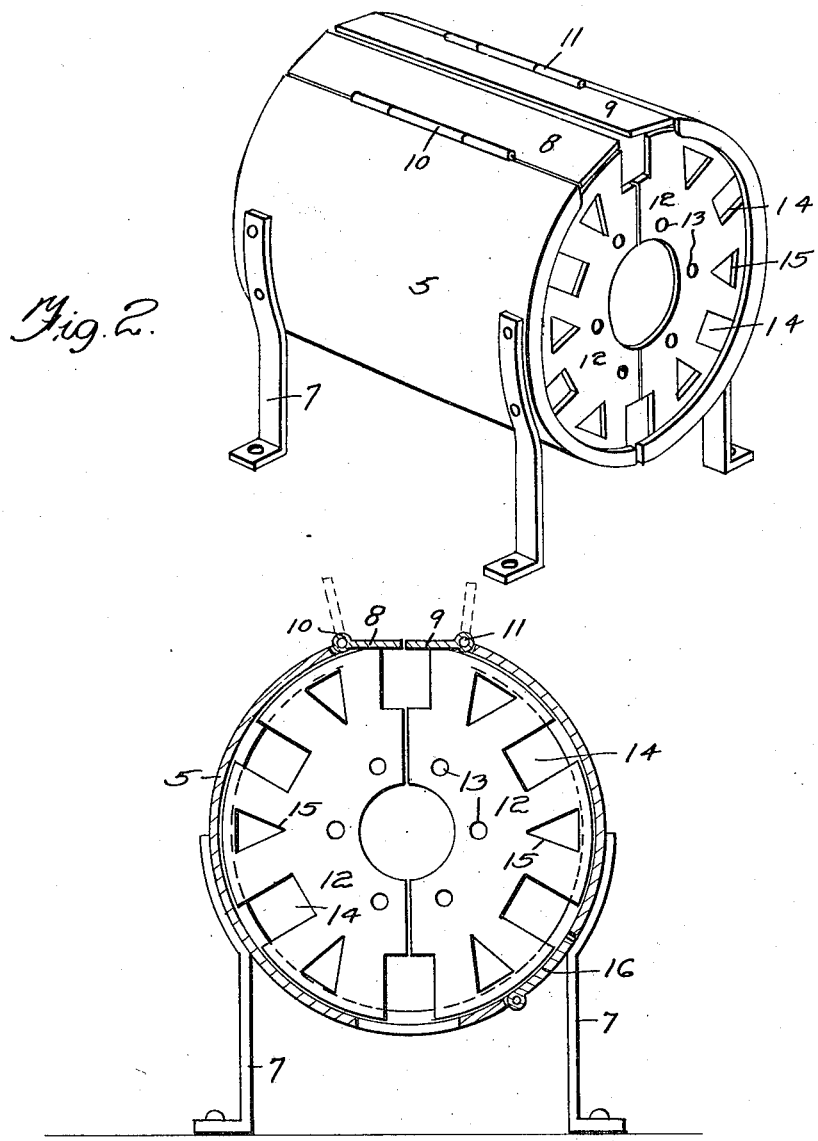
Fig. 2 is a perspective view of the oven.
Fig. 3 is a transverse sectional view through the oven.

Referring to the drawings it will be seen that the oven comprises a cylindrical casing 5 adapted to be supported in operative position with relation to the cone baking machine 6 by means of the supporting legs 7. The otherwise open top of this casing is adapted to be closed by longitudinally extending doors 8 and 9 which are hinged to the casing at 10 and 11. The rear wall 12 of the oven is separate from the casing 5 and is secured to and rotates bodily with the rotative part of the cone baking machine being secured to the rotative part of the cone baking machine by bolts 13. I preferably make this rear wall 12 in two sections, designated $12^a$ and $12^b$, for convenience in applying it to the cone baking machine. When in position the radially swinging core carrying arms $5^a$ of the cone baking machine lie in the notched out portions 14 of the rear wall 12 and when one of these arms is to be swung to open position, the doors 8 and 9 are opened and then said arm may be swung upwardly out of the corresponding notch 14 to withdraw the cores from the mold sections of the machine in the manner described in the patent aforesaid. The machine of the patent is a gas heated machine and consequently I provide in the rear wall 12 a plurality of openings 15 constituting ventilating openings for the admission of air. These openings also permit the middle burner to be lighted, through them, said burner not being shown since it forms no part of the present invention. A door 16 in the lower part of the casing 5 renders it possible to examine the flame of the burners from time to time or to light the gas through said door.

By confining the heat radiated from the bodily rotating mold sections and which heat would otherwise be dissipated and lost, said mold sections are caused to travel in a heated zone by virtue of which a more even baking of the cones is had.

It is to be understood that the invention is not limited to the precise construction set forth but that it includes within its purview whatever changes fairly come within either the terms or the spirit of the appended claims.

Having described my invention what I claim is:

1. The combination with a cone baking machine comprising a plurality of mold sections rotating about a horizontal axis and a core carrying arm associated with each of said mold sections and mounted to swing radially outward, of a casing within which said mold sections travel, said casing comprising a fixed cylindrical portion and a rotative end wall and moving with the mold sections.

2. A structure as recited in claim 1 wherein the fixed cylindrical portion is provided with elongated doors in its top portions through which said core carrying arms swing radially outward.

3. A structure as recited in claim 1 wherein said rotative wall has a plurality of notches formed in its periphery within which said radially moving arms lie, during the rotation of the machine.

4. A structure as recited in claim 1 wherein said end wall is provided with a plurality of ventilating openings.

5. The combination with a machine comprising a plurality of mold sections rotating about a horizontal axis and each of said mold sections having a core carrying arm associated therewith and adapted to swing radially outward, of a fixed casing enclosing said mold sections, said casing having an elongated opening in its top through which the core carrying portions of the mold sections may swing outwardly and a closure means for said opening.

In testimony whereof I hereunto affix my signature.

GIUSEPPE GERACE.